United States Patent
Kojima

(10) Patent No.: US 9,300,216 B2
(45) Date of Patent: Mar. 29, 2016

(54) SWITCHING POWER SUPPLY AND IMAGE FORMING APPARATUS EQUIPPED WITH SWITCHING POWER SUPPLY

(71) Applicant: CANON KABUSHIKI KAISHA, Tokyo (JP)

(72) Inventor: Keizo Kojima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 14/045,986

(22) Filed: Oct. 4, 2013

(65) Prior Publication Data

US 2014/0099139 A1    Apr. 10, 2014

(30) Foreign Application Priority Data

Oct. 10, 2012 (JP) ................... 2012-225131

(51) Int. Cl.

| | |
|---|---|
| G03G 15/00 | (2006.01) |
| H02M 3/335 | (2006.01) |
| G03G 15/20 | (2006.01) |
| H02M 1/00 | (2007.01) |

(52) U.S. Cl.
CPC ........... *H02M 3/33515* (2013.01); *G03G 15/80* (2013.01); *H02M 3/33507* (2013.01); *G03G 15/205* (2013.01); *G03G 15/5004* (2013.01); *H02M 2001/0035* (2013.01); *Y02B 70/16* (2013.01)

(58) Field of Classification Search
None
See application file for complete search history.

(56) References Cited

U.S. PATENT DOCUMENTS

| 8,867,047 B2* | 10/2014 | Hotogi | H02M 3/335 358/1.1 |
|---|---|---|---|
| 2008/0130324 A1* | 6/2008 | Choi et al. | 363/21.03 |
| 2009/0141520 A1* | 6/2009 | Grande | H02M 3/33523 363/21.16 |
| 2012/0195620 A1* | 8/2012 | Matsumoto | 399/88 |
| 2012/0313601 A1* | 12/2012 | Deguchi | H02M 3/156 323/282 |
| 2013/0064566 A1* | 3/2013 | Kojima | H02M 3/33523 399/88 |
| 2013/0108303 A1* | 5/2013 | Samejima | H02J 3/24 399/88 |
| 2013/0235620 A1* | 9/2013 | Morris | H02M 3/335 363/21.12 |
| 2013/0236204 A1* | 9/2013 | Yamaguchi | 399/88 |

(Continued)

FOREIGN PATENT DOCUMENTS

JP   2008-245419 A   10/2008

*Primary Examiner* — David Gray
*Assistant Examiner* — Geoffrey Evans
(74) *Attorney, Agent, or Firm* — Canon USA, Inc. IP Division

(57) ABSTRACT

A power supply device including a transformer having a primary winding and a secondary winding, and a switching element connected to the primary winding configured to drive the switching element to output voltage from the secondary winding includes a control unit configured to drive the switching element such that the switching element is turned on and, in which, in a case where the control unit performs an intermittent drive operation which repeats a period for which the switching element is driven and a period for which the drive of the switching element is stopped, in which the control unit drives the switching element such that the switching element is turned off before the voltage according to the current flowing to the primary winding reaches the voltage output from the secondary winding in the period for which the switching element is driven.

8 Claims, 10 Drawing Sheets

(56) References Cited

U.S. PATENT DOCUMENTS

| | | | |
|---|---|---|---|
| 2013/0294118 A1* | 11/2013 | So | H02M 3/33507 363/21.16 |
| 2014/0009978 A1* | 1/2014 | Brinlee | H02M 3/33569 363/25 |
| 2014/0016373 A1* | 1/2014 | Zhang | H02M 3/33523 363/21.15 |
| 2014/0091720 A1* | 4/2014 | Brinlee | H05B 33/0815 315/186 |
| 2014/0160808 A1* | 6/2014 | Sato | H02M 3/33507 363/21.02 |
| 2015/0016152 A1* | 1/2015 | Kojima | G03G 15/80 363/21.02 |
| 2015/0084606 A1* | 3/2015 | Nakamura | H02M 3/156 323/246 |
| 2015/0138844 A1* | 5/2015 | Karlsson | H02M 3/33592 363/21.1 |
| 2015/0147080 A1* | 5/2015 | Uchiyama | G03G 15/5004 399/88 |

\* cited by examiner

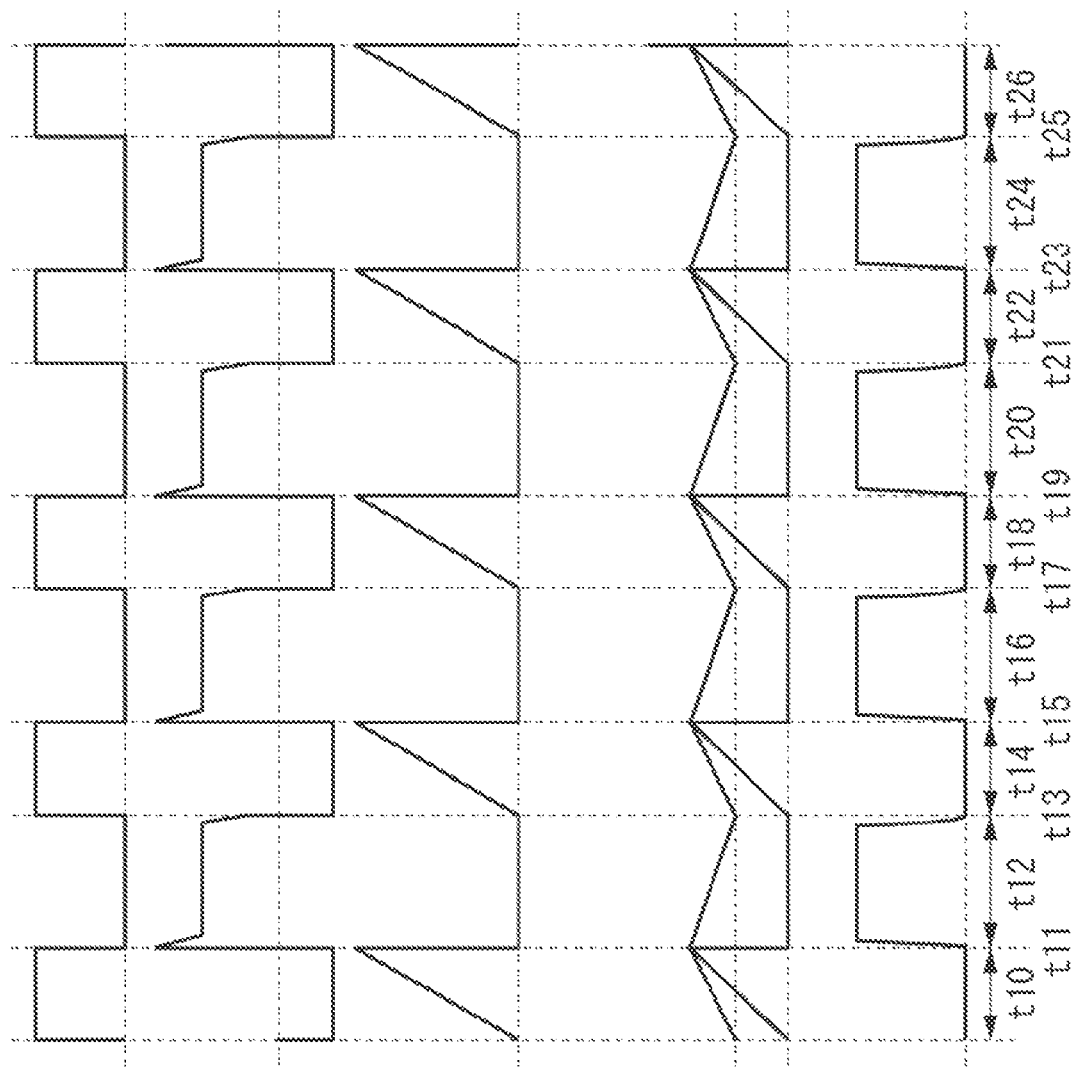

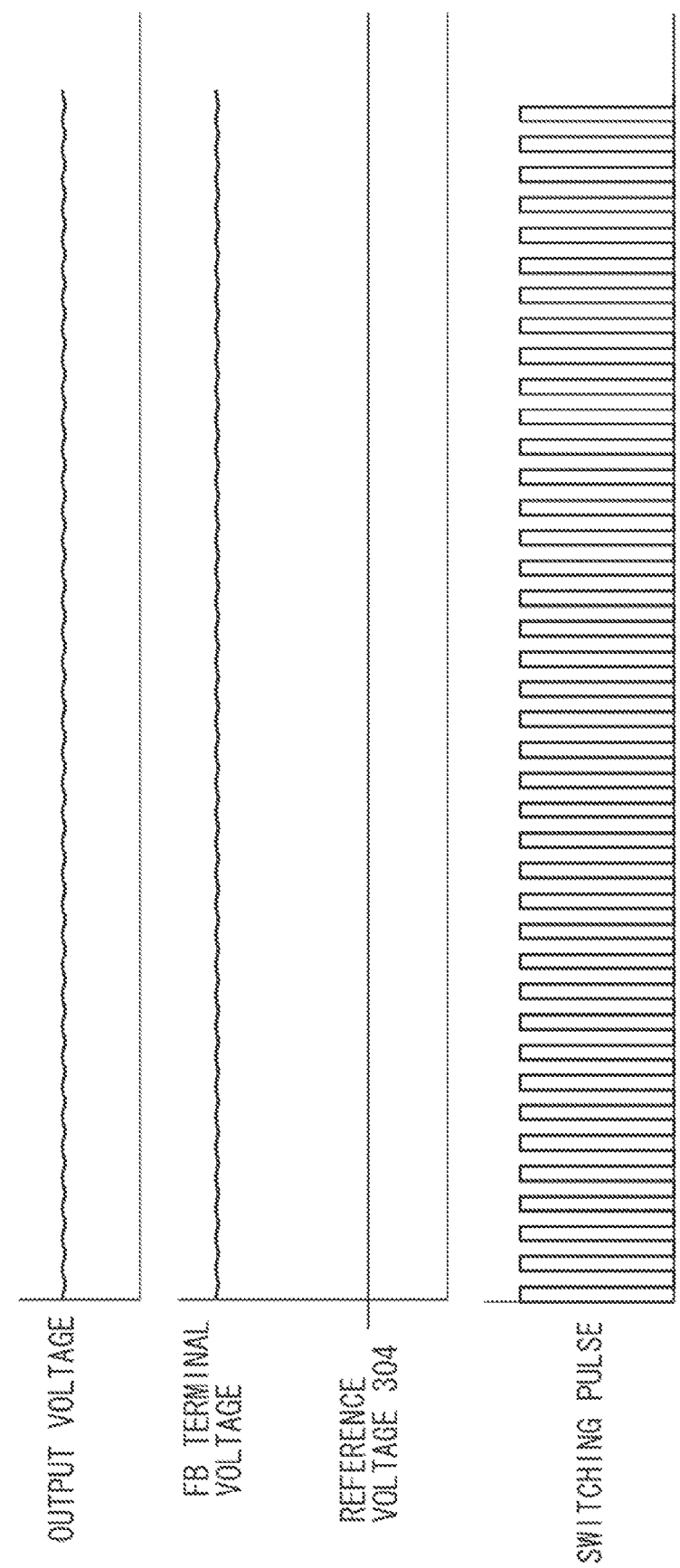

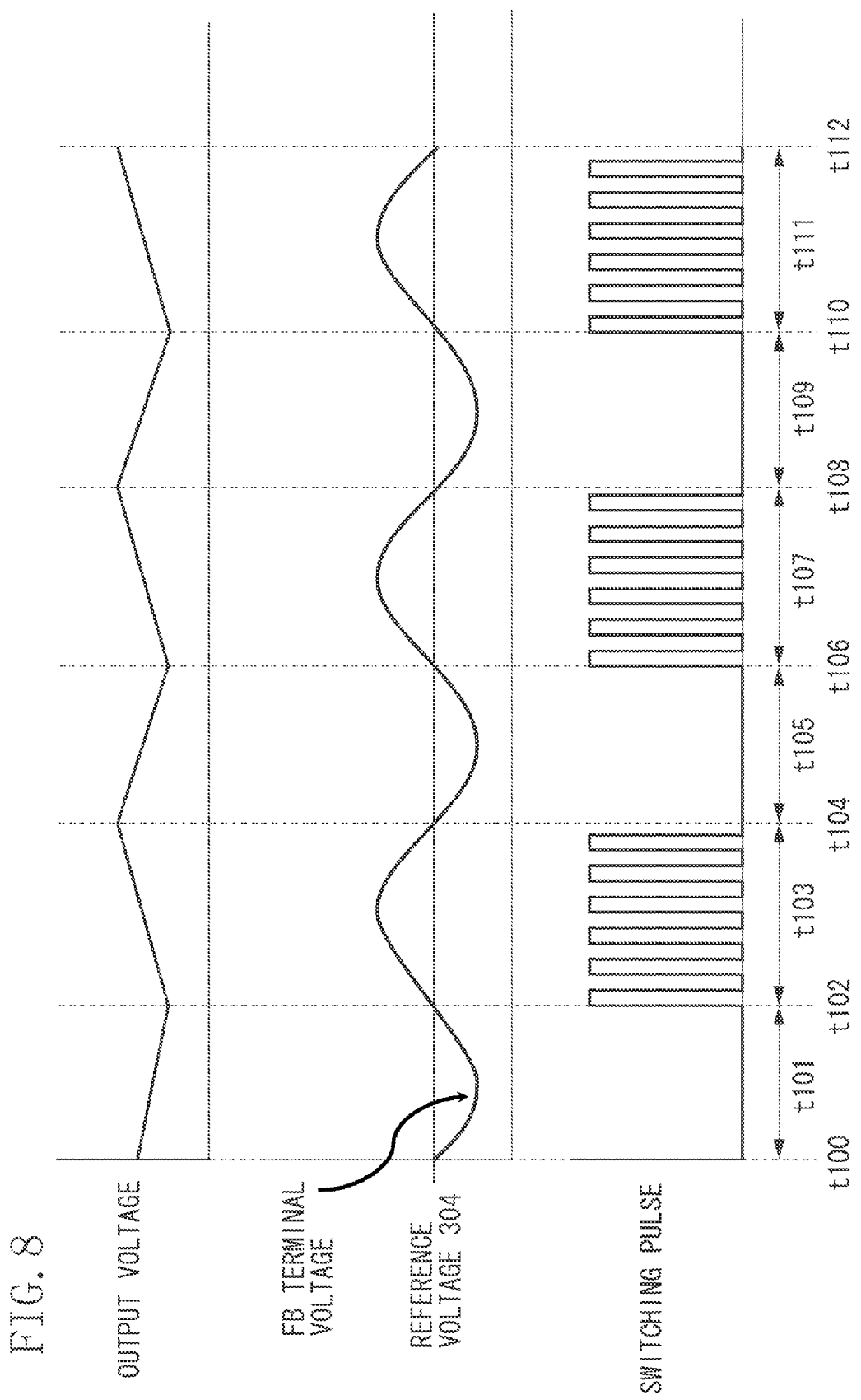

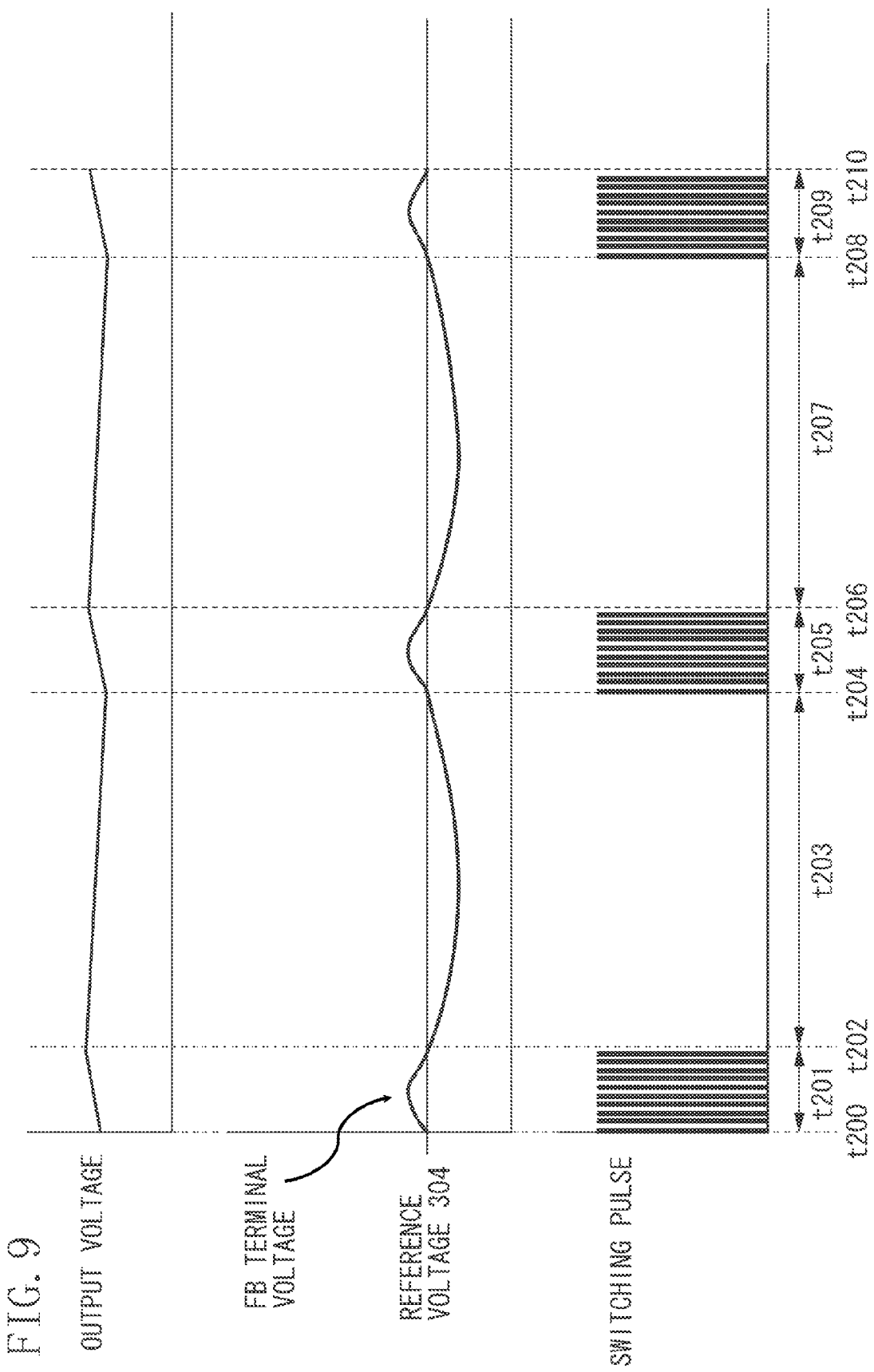

SWITCHING POWER SUPPLY AND IMAGE
FORMING APPARATUS EQUIPPED WITH
SWITCHING POWER SUPPLY

BACKGROUND OF THE INVENTION

1. Field of the Invention

One disclosed aspect of the embodiments relates to a switching power supply and, in particular, is useful for a switching power supply equipped with a burst mode for stopping switching operation for a certain period of time.

2. Description of the Related Art

There has been known a switching power supply which controls output voltage using an integrated circuit (IC) as a low voltage power supply for an electronic apparatus. In recent years, there has been trend of further reducing power in the standby period for operation of an electronic apparatus to demand to reduce the power consumption of the switching power supply itself. As a configuration for reducing the power consumption of the switching power supply, Japanese Patent Application Laid-Open No. 2008-245419 discusses a system for controlling switching operation (also referred to as burst operation) in such a manner that the voltage level across a feedback terminal is set to be varied depending on a load condition on the output side of the switching power supply to decrease an ON period and increase an OFF period of the switching power supply at the time of a light load.

Operation states of the switching power supply include three states: a heavy load state in which an application apparatus is in operation; a light load state in which the apparatus is not in operation and a part thereof is stopped to reduce power consumption; and a middle load state in which the apparatus is on standby so as to be able to start whenever it is required. It is effective to perform the burst operation in the light load state to further reduce power consumption in the middle load state. However, the switching power supply which performs the burst operation in the middle load state to reduce power consumption has the following problems to be solved.

Since a load current is relatively large in the middle load state of the switching power supply, a change is also large in an output voltage in an OFF period (a period for which the burst operation is forcibly turned off) of a switching element (a field effect transistor, for example) and in a voltage across the feedback terminal of an power supply IC controlling the operation of the switching element. For this reason, a pulse width of the switching element at the time of ON state also becomes long. A long pulse width increases an instantaneous electric power to be transferred to a secondary side via an insulation transformer and also increases change in an output voltage in an ON period of the switching element and a fed back voltage. As a result, the ripple voltage of the output voltage is increased.

In general, a trade off relationship exists between the reduction of power consumption in the switching power supply and an increase in the ripple voltage of the output voltage. The ripple voltage tends to be large in a recent switching power supply that attaches importance to the reduction of power consumption.

SUMMARY OF THE INVENTION

One disclosed aspect of the embodiments is directed to reducing power consumption in a switching power supply and suppressing an output ripple in a middle load state.

According to an aspect of the embodiments, a switching power supply includes a transformer having a primary winding on its primary side and of which the primary side is insulated from its secondary side, a switching element connected to the primary winding of the transformer, a current detection unit configured to detect voltage according to current flowing to the primary side of the transformer, a feedback unit configured to feed back voltage according to voltage output to the secondary side to the primary side, and a control unit configured to control the operation of the switching element based on the voltage detected by the current detection unit and the voltage from the feedback unit, in which the control unit determines a driving time period of the switching element by comparing the voltage from the feedback unit with a predetermined reference voltage to restrict or release the upper limit of a driving pulse time period for driving the switching element according to the comparison results.

According to another aspect of the embodiments, an image forming apparatus for forming an image on a recording material includes a controller for controlling the operation of the image forming apparatus and a switching power supply for supplying power to the controller. The switching power supply includes a transformer having a primary winding on its primary side and of which the primary side is insulated from its secondary side, a switching element connected to the primary winding of the transformer, a current detection unit configured to detect voltage according to current flowing to the primary side of the transformer, a feedback unit configured to feed back voltage according to voltage output to the secondary side to the primary side, and a control unit configured to control the operation of the switching element based on the voltage detected by the current detection unit and the voltage from the feedback unit, in which the control unit determines a driving time period of the switching element by comparing the voltage from the feedback unit with a predetermined reference voltage to restrict or release the upper limit of a driving pulse time period for driving the switching element according to the comparison results.

Further features of the disclosure will become apparent from the following description of exemplary embodiments with reference to the attached drawings.

BRIEF DESCRIPTION OF THE DRAWINGS

FIG. 6 illustrates operational waveforms of the switching power supply.

FIG. 7 illustrates a state of the switching power supply in a heavy load state.

FIG. 8 illustrates a state of the switching power supply in a middle load state.

FIG. 9 illustrates a state of the switching power supply in a light load state.

DESCRIPTION OF THE EMBODIMENTS

A specific configuration for solving the above problems is described below based on the following exemplary embodiments. The following exemplary embodiments are merely examples, and do not limit the technical scope of the disclosure to the examples. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Prerequisite Configuration and Operation of a Switching Power Supply

Figure 5:
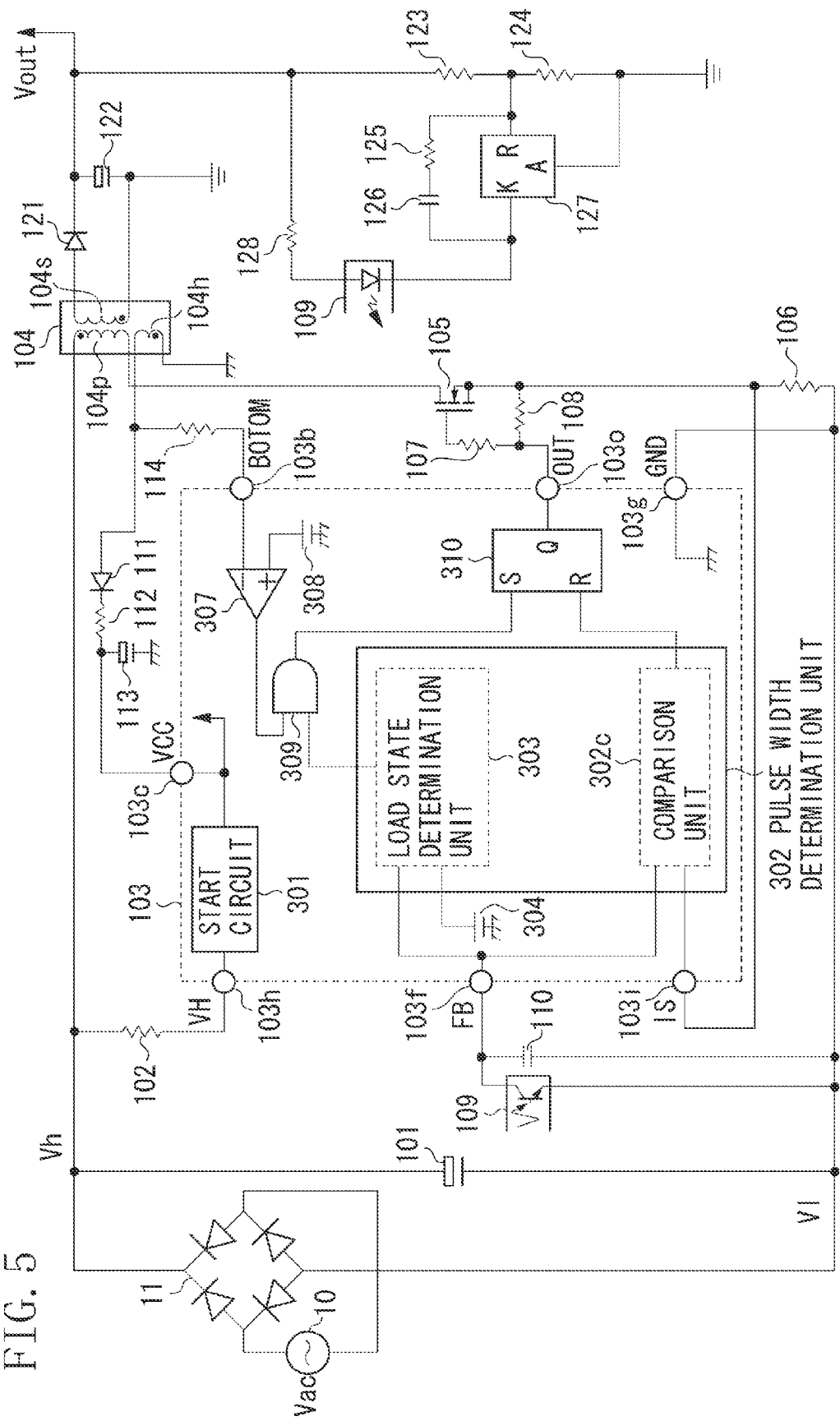
FIG. 5 illustrates a configuration of a switching power supply.

Prerequisite configuration and operation of a switching power supply are described below with reference to FIGS. 5 and 6. FIG. 5 is a diagram illustrating a configuration of a general switching power supply. FIG. 6 is a diagram illustrating switching operation in the heavy load state of the switching power supply. FIG. 7 is a diagram illustrating continuous operational state of the switching power supply in the heavy load state.

In FIG. 5, an alternating current voltage input from a commercial alternating current power supply Vac 10 is rectified by a diode bridge 11 and smoothened by a primary electrolytic capacitor 101 to be a substantially constant voltage Vh. At the same time, voltage is supplied to a starting VH terminal 103h of a power supply IC 103 via a resistor 102. The power supply IC 103 turns on a field effect transistor (FET) 105. Then, a drain current Id flows to the FET 105 (refer to a period t10 in FIG. 6) via a primary winding 104p on the primary side of an insulation transformer 104 whose primary and secondary sides are insulated. In the period t10, the drain current Id linearly increases as time elapses. The drain current Id is converted to a voltage Vis by a current detection resistor 106 and supplied to a current detecting IS terminal 103i of the power supply IC 103.

A feedback FB terminal 103f of the power supply IC 103 is supplied with voltage Vfb by a photo coupler 109 for feeding back voltage from the secondary side of the insulation transformer 104 to the primary side thereof. The voltage Vfb is an error amplification signal of the switching power supply, decreases if the output voltage is larger than a prescribed value, and increases if the output voltage is smaller than the prescribed value. The power supply IC 103 turns off the FET 105 (at the timing of t11 in FIG. 6) when the voltage Vis increases and becomes slightly larger than the voltage Vfb. When the FET 105 is turned off, the drain current Id instantaneously becomes zero. Then, the drain-source voltage Vds of the FET 105 increases and reaches a substantially constant voltage Vh+V1 (a period t12 in FIG. 6).

A secondary winding 104s and an auxiliary winding 104h as well as the primary winding 104p are wound around a transformer T1. The secondary winding 104s and the auxiliary winding 104h are different in winding direction from the primary winding 104p (referred to as flyback connection). A positive pulse voltage is induced in the secondary winding 104s and the auxiliary winding 104h after the FET 105 is turned off (a period t12 in FIG. 6). The pulse voltage induced in the secondary winding 104s is rectified and smoothened by a secondary rectifier diode 121 and a secondary smoothing capacitor 122 to be a substantially constant output voltage Vout. If the forward voltage of the secondary rectifier diode 121 is taken as Vf121, the voltage V1 can be represented by the following equation (1) using the output voltage Vout:

$$V_d \cong (V_{out} + V_{f121}) \cdot \frac{N_p}{N_s} \quad (1)$$

If the positive pulse voltage induced in the auxiliary winding 104h is taken as Vnh, the positive pulse voltage Vnh can be represented by the following equation (2) using the output voltage Vout:

$$V_{nh} \cong (V_{out} + V_{f121}) \cdot \frac{N_h}{N_s} \quad (2)$$

Where, Np is the number of turns of the primary winding 104p, Ns is the number of turns of the secondary winding 104s, and Nh is the number of turns of the auxiliary winding 104h.

Current If flowing into the secondary winding 104s linearly decreases and reduces to zero with time. Then, the drain-source voltage Vds starts lowering. The drain-source voltage Vds is similar in shape to the terminal voltage V104h of the auxiliary winding 104h. The terminal voltage V104h is supplied to a BOTOM terminal 103b of the power supply IC 103. The power supply IC 103 detects time when the terminal voltage V104h is a falling edge and reduces to zero (timing t13 in FIG. 6) and turns on the FET 105. After that, the periods t10 to t13 are repeated. When the FET 105 is turned on again at a period t14 in FIG. 6, a drain current Id starts again flowing in the FET 105 via the primary winding 104p of the insulation transformer 104.

Such an operation causes the FET 105 to continuously oscillate in the heavy load state as illustrated in FIG. 7 to continuously output a switching pulse, keeping a state where a feedback voltage (FB terminal voltage) exceeds a reference voltage and the output voltage is maintained at a high value.

The operation of the power supply IC 103 is described in detail below. The operation of the power supply IC 103 in its operation in the heavy load state illustrated in FIG. 7 is described in detail below with reference to the internal block diagram of the power supply IC 103 illustrated in FIG. 5 and FIG. 6.

In FIG. 5, the voltage Vis input to the IS terminal 103i and the voltage Vfb input to the FB terminal 103f are compared by a comparison unit 302c of a pulse width determination unit 302 configured to determine the drive time of the FET 105. As described in FIG. 6, the voltage Vfb is greater than the voltage Vis when the FET 105 is turned on. The voltage of an OUT terminal 103o of the power supply IC 103 is at a high state (High level (H level)). Therefore, a reset input to a set and reset flip flop 310 at the rear stage of the pulse width determination unit 302 is at an L level and a Q output of the set and reset flip flop 310 maintains the existing output state (H level). The Q output is connected to the OUT terminal 103o of the power supply IC 103, and is supplied to the FET 105 as the gate voltage Vg of the FET 105 via a gate resistor 107. Consequently, the FET 105 is kept to be ON (the period t10 in FIG. 6).

When the voltage Vis increases, as the drain current Id increases, and becomes slightly larger than the voltage Vfb, the output of the pulse width determination unit 302 is at the H level. Accordingly, the flip flop 310 is reset and the Q output becomes L level. Therefore, the OUT terminal 103o is at the L level and the FET 105 is turned off (the timing t11 in FIG. 6).

When the current If flowing to the secondary winding 104s is reduced to zero, the pulse voltage Vnh is lowered to a negative voltage.

The pulse voltage Vnh is supplied to the BOTOM terminal 103b. The output of a trigger circuit 307 in the power supply IC 103 is reversed from the previous Low level (L level) to High level (H level) when the pulse voltage Vnh is a falling edge and reduces to zero and maintained at the H level thereafter.

The output of the trigger circuit 307 is input to an AND circuit 309. Since an H level described below is input to another input of the AND circuit 309, the output of the AND circuit 309 is at the H level. In response to this, the flip flop 310 is set and the Q output is at the H level. Therefore, the OUT terminal 103o is at the H level to turn on the FET 105 (refer to the period t14 in FIG. 6). When the output of the pulse width determination unit 302 is at the H level, in other words, when the voltage Vis increases and becomes slightly larger than the voltage Vfb and the FET 105 is turned off, the output of the trigger circuit 307 is cleared and returns to the L level from the H level (t15).

The operation of the switching power supply in the middle load state (where a load is smaller than that in the above described heavy load state) is described below. FIG. 8 illustrates the operation of the switching power supply in the middle load state. A period for which a switching pulse is stopped exists in FIG. 8 compared to the state in FIG. 7.

In the middle load state illustrated in FIG. 8, timings t10 to t13 in FIG. 6 are repeated to make the voltage Vfb smaller than a reference voltage 304 (refer to timing t104 in FIG. 8) because the power consumed at the secondary side is smaller than the power supplied via the insulation transformer 104. Then, the output of a load state determination unit 303 in the power supply IC 103 is at the L level. The output of the load state determination unit 303 is input to the AND circuit 309. Therefore, while the output of the load state determination unit 303 is being at the L level, the output of the AND circuit 309 is at the L level independent of the output level of the trigger circuit 307 and the Q output of the flip flop 310 is still kept at the L level. For this reason, the OUT terminal 103o is at the L level and the FET 105 keeps an off state (refer to a period t105 in FIG. 8). At this point, the power supply to the secondary side via the insulation transformer 104 is temporarily stopped.

While the FET 105 keeps the off state, the output of the trigger circuit 307 is at the H level when the current If flowing into the secondary winding 104s reduces to zero (refer to t13 in FIG. 6). Since the Vfb is temporarily stopping the power supply to the secondary side, the Vfb slowly increases and when the Vfb exceeds the reference voltage 304, the output of the load state determination unit 303 reaches the H level (refer to timing t16 in FIG. 6). At this point, the Q output of the flip flop 310 becomes the H level. A relationship between the voltage Vfb and the voltage Vis at this point is that Vfb>Vis because the FET 105 keeps the off state. Therefore, the OUTPUT terminal is at the H level and the FET 105 is turned on. The switching operation at the periods t10 to t13 (FIG. 6) is repeated until the voltage Vfb becomes smaller than the pulse stop voltage 304 (t17).

As described above, a control whereby to forcibly stop the switching operation of the FET 105 (referred to as burst operation) is performed in the middle load state. This decrease loss due to switching and allows reducing the power consumption of the apparatus.

The operation of the switching power supply in the light load state is described in detail below. In recent years, there has been a strong demand for reducing standby power of an electronic apparatus. In the switching power supply, power consumption in the light load state corresponds to the standby power.

FIG. 9 illustrates the operation of the switching power supply in the light load state. In the light load state, a forcibly turned off time of the FET 105 is longer than the period t105 in the middle load state illustrated in FIG. 8. This is because load current is small on the secondary side of the transformer and the output voltage slowly decreases. Since power consumption on the secondary side is small, the period for which the FET 105 is turned on (a period t201, the number of ON per unit time, time of one pulse) is shorter than a period t103 illustrated in FIG. 8. Although the difference in time between the periods t105 and t203 is different depending on the load current, as far as a load state corresponds to the above standby power, a relationship of a time difference becomes t105>t203.

Thereby, a burst operating frequency Fbst_low in the light load state becomes lower than a burst operating frequency Fbst_mid in the middle load state to allow reducing loss due to switching of the FET 105, enabling further lowering the power consumption of the apparatus.

As described above, the following formula generally holds true for the burst operating frequency Fbst_mid (the frequency of the burst operation) in the middle load state and the burst operating frequency Fbst_low (the frequency of the burst operation) in the light load state:

$$Fbst\_mid > Fbst\_low \quad (3)$$

A relationship between an output load condition and the pulse width and the number of switching times of the FET 105 is described below.

It is important not only to lower the switching frequency of the FET 105, but also to reduce the number of switching times in order to reduce power consumption in the light load state as described above. This is because increase in the number of switching times increases switching loss occurring when the switching FET 105 is turned on and off to increase power consumption.

As described above, the power supply IC 103 compares the terminal voltage of the feedback terminal 103f with the reference voltage 304 to determine the number of continuous switching and compares the voltage Vis input to the IS terminal 103i with the voltage Vfb input to the feedback terminal 103f to determine the pulse width of the switching FET 105.

In another words, the continuous switching is continued until the terminal voltage of the feedback terminal 103f becomes smaller than the reference voltage 304, so that roughly, the greater the load current, the greater the number of continuous switching times.

Consequently, the following formula generally holds true for the number of continuous switching times Sbst_nm (the frequency in the burst operation) in the middle load state and the number of continuous switching times Sbst_nl (the frequency in the burst operation) in the light load state:

$$Sbst\_nm > Sbst\_nl \quad (4)$$

As described above, it is obvious that the number of switching times per unit time can be represented as follows:
the number of continuous switching times Snh in the heavy load state (continuous switching operation and limitless)
the number of continuous switching times 5 nm in the middle load state (the frequency in the burst operation)
the number of continuous switching times Snl in the light load state (the frequency in the burst operation)

$$Snh > Snm > Snl \quad (5)$$

The larger a difference between the voltage Vis and the voltage Vfb, the longer the pulse width. The greater the load current, the longer the pulse width. However, the maximum pulse widths in the heavy and middle load states may be equal to each other depending on the relationship of the above formula (4) and the response of a feedback loop.

More specifically, the following equation holds true for the maximum pulse width PWh_Max in the heavy load state, the maximum pulse width PWm_Max in the middle load state, and the maximum pulse width PWl_Max in the light load state:

$$\text{PWh\_Max} \approx \text{PWm\_MAX} > \text{PWl\_MAX} \quad (6)$$

As described above, in order to reduce the consumption power of the switching power supply not only in the light load state, but also in the middle load state, it is required that the pulse width be increased when the FET 105 is turned on and the number of switching times be decreased.

As described above, the power supply IC 103 determines the on-period of the FET 105 according to results obtained by the comparison unit 302c of the pulse width determination unit 302 comparing the voltage Vis input to the IS terminal 103i with the voltage Vfb input to the FB terminal 103f. Since the switching power supply performs the burst operation despite the fact that a load current is comparatively large in a load range immediately before the switching operation is shifted from the middle load state to the heavy load state, the output ripple becomes large. In other words, the output ripple becomes large during shifting period from the heavy load state to the middle load state.

Since the load current is comparatively large in the middle load state illustrated in FIG. 8, a change in the output voltage in the off-period of the FET 105 (a forcibly turned off period in the burst operation) and the FB terminal voltage is also large. For this reason, the pulse width in the on-period of the FET 105 determined by the comparison unit 302c also becomes long. The long pulse width increases the instantaneous electric power transferred to the secondary side via the insulation transformer 104 and a change in the output voltage in the on-period of the FET 105 and the voltage Vfb input to the FB terminal 103f. This makes the ripple voltage of the output voltage large.

As described above, a current trend to a low power consumption further lowers the burst operating frequency Fbst_low in the light load state and the burst operating frequency Fbst_mid in the middle load state. The low burst operation frequency Fbst_mid increases the pulse width in the off-period of the FET 105 and at the on state of the FET 105, thereby a phenomenon illustrated in FIG. 8 more conspicuously appears.

In general, a trade off relationship exists between the reduction of power consumption in the switching power supply and an increase in the ripple voltage of the output voltage. The ripple voltage tends to be large in a recent switching power supply that attaches importance to the reduction of power consumption.

The switching power supply for solving the problems in the above switching power supply is described in detail below.

A first exemplary embodiment is described below.

Figure 1:
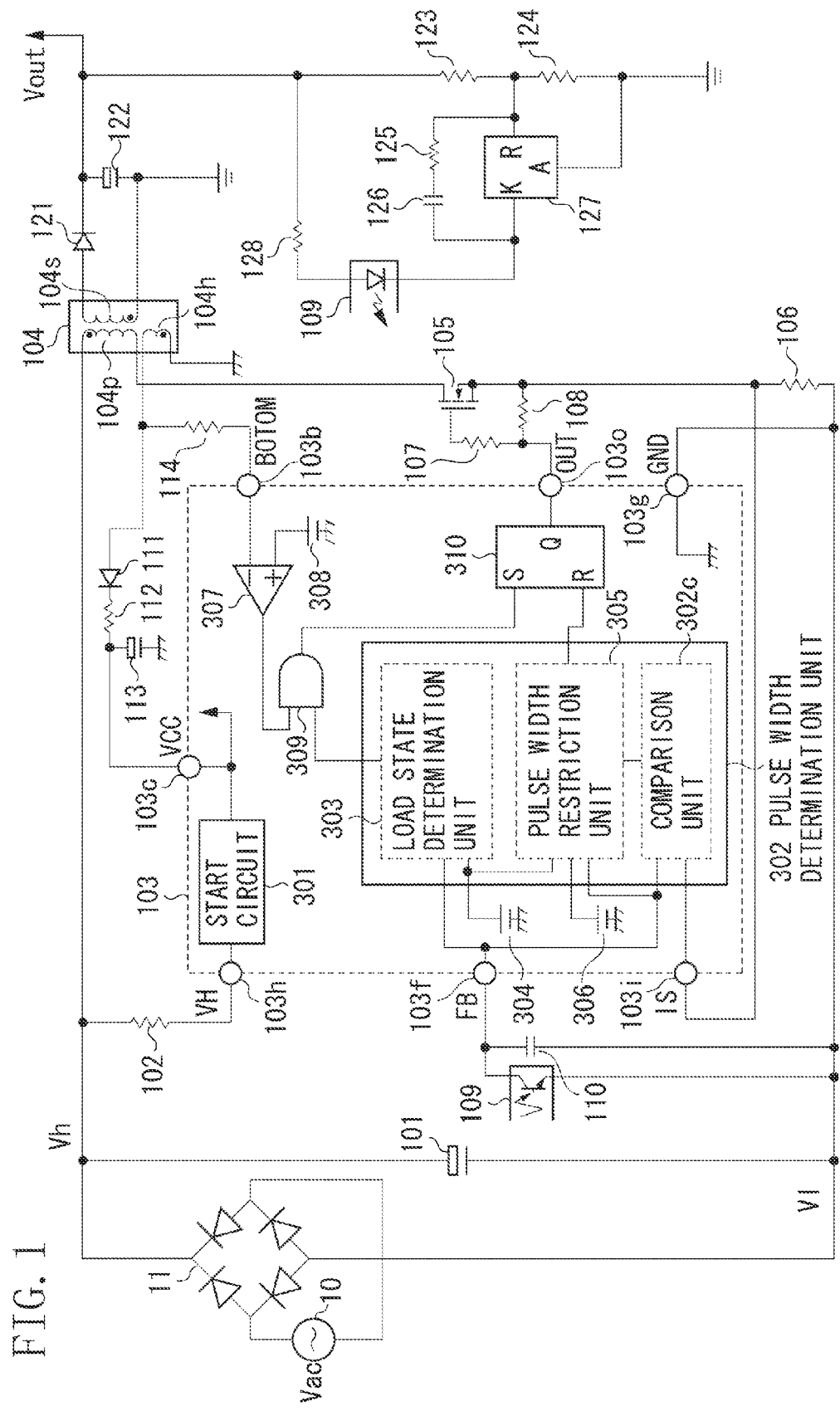
FIG. 1 illustrates a configuration of a switching power supply according to a first exemplary embodiment.
Figure 2:
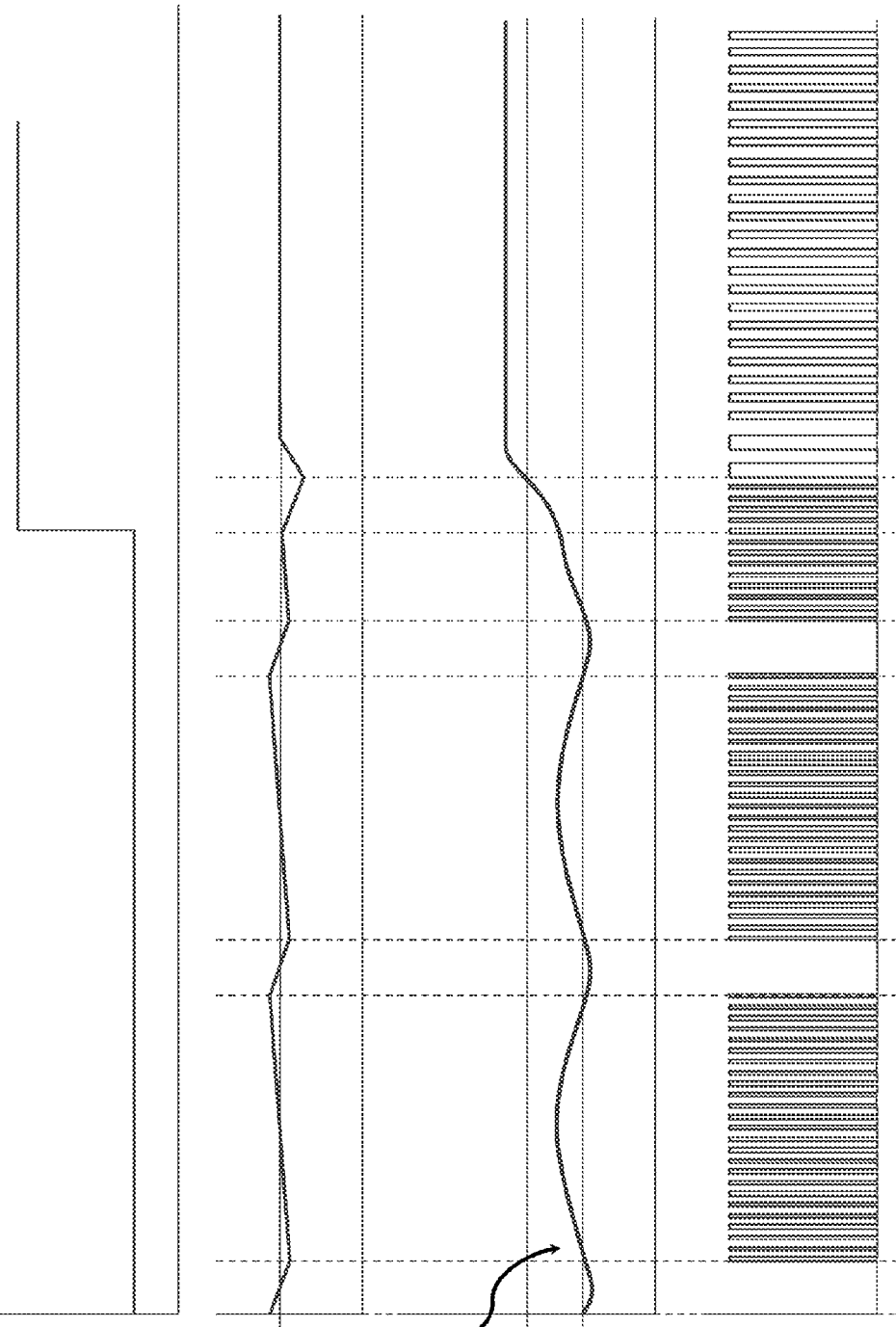
FIG. 2 illustrates operational waveforms of the switching power supply according to the first exemplary embodiment.

FIG. 1 illustrates a switching power supply according to the first exemplary embodiment. The components similar to those of the switching power supply described in FIG. 5 are given the same reference numerals and the description thereof is omitted. FIG. 2 illustrates operational waveforms representing characteristics of the switching power supply according to the first exemplary embodiment. In the present exemplary embodiment, with respect to the switching power supply illustrated in FIG. 5, a pulse width restriction unit 305 and a reference voltage 306 used for determining the restriction of the upper limit of a drive pulse period of the switching element are added to the pulse width determination unit 302 configured to determine the drive period of the switching element in the power supply IC 103.

In the present exemplary embodiment, a relationship between the reference voltage 304 being a first reference voltage and the reference voltage 306 being a second reference voltage can be represented by the following formula:

$$\text{the reference voltage 306} > \text{the reference voltage 304} \quad (7)$$

The above relationship provides the pulse width restriction unit 305 with hysteresis characteristics. The pulse width restriction unit 305 includes a timer (not Illustrated) and a gate circuit and the final output thereof is connected to the RS flip flop 310. The operations of the pulse width restriction unit 305 can be represented as follows:

(1) Determination as to whether to restrict the pulse width or release the restriction of the pulse width;
(2) Count of an H-level output continuous period of the comparison unit 302c by the timer;
(3) Mask signal determined by the above operations (1) and (2); and
(4) Determination of final output by the mask signal and the comparison unit 302c.

In the above operation (1), the voltage Vfb input to the FB terminal 103f is compared with the reference voltage 304 and the reference voltage 306 to determine whether to restrict the pulse width or release the restriction of the pulse width based on the comparison results. More specifically, if the voltage Vfb is smaller than the reference voltage 304, the pulse width is restricted. If the voltage Vfb is larger than the reference voltage 306, the restriction of the pulse width is released. If the voltage Vfb is between the reference voltage 304 and the reference voltage 306, the previous state is maintained.

The count in the operation (2) is performed only when the result of the operation (1) is given by "restriction of the pulse width." If the result of the operation (1) is given by "restriction of the pulse width," at the same time as the output of the comparison unit 302c is at the H level and, the timer (not illustrated) in the pulse width restriction unit 305 starts count of H-level continuous time of the output of the comparison unit 302c. If the result of the operation (1) is given by "release the restriction of the pulse width" or the output of the comparison unit 302c is at the L level, the timer does not count.

A mask signal in the operation (3) is a signal that makes the result of the comparison unit 302c effective (this state is taken as a mask release state) or ineffective (this state is taken as a mask state). The signal determines whether the pulse width is restricted. If a counter value in the operation (2) is less than a predetermined value, the mask release state is set and the H level is output. If a counter value in the operation (2) is equal to of more than a predetermined value, the mask state is set and the L level is output.

In the operation (4), the pulse width restriction unit 305 outputs a final output signal to the RS flip flop 310. The pulse width restriction unit 305 outputs the H level using the gate circuit only when both the output of the mask signal in the operation (3) and the output of the comparison unit 302c are at the H level state. If the mask signal is in the mask state (the L level), the signal output to the RS flip flop 310 is at the L level even if the output of the comparison unit 302c is at the H level state.

The above operation of the pulse width determination unit 302 realizes operation for the restriction of the pulse width of turning on of the FET 105 with the hysteresis characteristics.

The switching power supply according to the present exemplary embodiment is characterized by operation in the middle load state. The operation in the middle load state is described below in association with the operational waveforms in FIG. 6.

In the middle load state of a conventional switching power supply, timings t10 to t13 in FIG. 6 are repeated to make the voltage Vfb smaller than a reference voltage 304 because the power consumed at the secondary side is smaller than the power supplied via the insulation transformer 104 (t104). Then, the output of the load state determination unit 303 in the power supply IC 103 is at the L level. The output of the load state determination unit 303 is input to the AND circuit 309. Therefore, while the output of the load state determination unit 303 is being at the L level, the output of the AND circuit 309 is at the L level independent of the output level of the trigger circuit 307 and the Q output of the flip flop 310 is still kept at the L level. For this reason, the OUT terminal 103o is at the L level and the FET 105 keeps an off state (t105). At this point, the power supply to the secondary side via the insulation transformer 104 is temporarily stopped.

In the switching power supply according to the present exemplary embodiment, this state corresponds to the period t300 illustrated in FIG. 2. At the same time, when the voltage Vfb is smaller than the reference voltage 304, the upper limit of the pulse width is provided at the time of turning on the FET 105 and the pulse width restriction unit 305 in the switching power supply according to the present exemplary embodiment restricts the output of the comparison unit 302c.

In FIG. 6, when the FET 105 continues to be in an off state, the output of the trigger circuit 307 becomes the H level (t13) when the current If becomes zero. Since the Vfb is temporarily stopping the power supply to the secondary sided, the Vfb slowly increases and when the Vfb exceeds the reference voltage 304, the output of the comparison unit 302c, the pulse width restriction unit 305, and the load state determination unit 303 reaches the H level (t106). Therefore, the OUTPUT terminal is at the H level and the FET 105 is turned on.

In the present exemplary embodiment, at the same time as the output of the comparison unit 302c becomes at the H level, the timer (not illustrated) in the pulse width restriction unit 305 starts count of H-level continuous time of the output of the comparison unit 302c. When the FET 105 is turned on, in the case of the conventional example in FIG. 5, the power supply IC 103 turns off the FET 105 (t11) when the voltage Vis increases and becomes slightly larger than the voltage Vfb. In the present exemplary embodiment, on the other hand, the pulse width restriction unit 305 restricts the pulse width by the above operations (1) to (4), so that the output of the pulse width restriction unit 305 becomes the L level when the count of the output H level continuous time of the comparison unit 302c reaches a predetermined value even if the voltage Vis does not reach the voltage Vfb. This turns off the FET 105.

As described above, if the FET 105 is turned off before the voltage Vis reaches the voltage Vfb in the middle load state, the power instantaneously transferred to the secondary side is smaller than that in the conventional example illustrated in FIG. 5. For this reason, in the present exemplary embodiment, the number of turning-on times of the FET 105 per one burst cycle is larger than that of a conventional example. This means that a necessary power is supplied by decreasing an instantaneous power supplied at a time and increasing the number of switching times at the time of the burst operation in the middle load state.

Thus, at the time of the burst operation, if the instantaneous power supplied at a time is decreased by restricting the output of the comparison unit 302c by the pulse width restriction unit 305, change in the output voltage and the terminal voltage become also gentle to allow decreasing the ripple voltage of the output voltage.

In the present exemplary embodiment, the time period of the H level output from the comparison unit 302c is measured to restrict the pulse width. The method for restricting the pulse width is not limited to the above one, but the pulse width may be restricted by any means of the signals input to the RS flip flop 310, such as on-duty of the FET 105, at least one of the voltage Vfb and the voltage Vis which are compared by the comparison unit 302c, or the output of the RS of the flip flop 310.

In the present exemplary embodiment, since the upper limit of the pulse width at the time of turning on the FET 105 is set in the burst operation, such a load condition exists that a power required on the secondary side cannot be sufficiently supplied. In such a case, the middle load state is transferred to the heavy load state.

FIG. 2 illustrates operational waveforms under the load condition transitioned from the middle load state to the heavy load state after the timing t309 or later. The following describes the operational waveforms in detail.

In FIG. 2, if the feedback terminal voltage Vfb exceeds the reference voltage 304 at the timing t309, switching operation is repeated while the pulse width restriction unit 305 is restricting the pulse width at the time of turning on the FET 105. Thereafter, at a timing t310, when load current increases and output voltage is lowered again, a sufficient power cannot be supplied for power consumption required on the secondary side and the feedback terminal voltage Vfb increases to the reference voltage 306 (timing t311).

If the feedback terminal voltage Vfb exceeds the reference voltage 306, the timer in the pulse width restriction unit 305 stops counting the pulse width to release the restriction of the pulse width.

Thereby, the power supply IC 103 turns on the FET 105 until the voltage Vis increases and becomes slightly larger than the voltage Vfb (t311 or later).

The following describes operation in the light load state. In the present exemplary embodiment, the pulse width restriction unit 305 restricts the pulse width at the time of turning on the FET 105 in the burst operation. Such a restriction of the pulse width increases the number of switching times, there is concern that the power consumption increases in the light load state where a reduction in power consumption is required. In the present exemplary embodiment, in view of such actual situation, the pulse width determined by the restriction of the pulse width is set larger than the pulse width in the light load state. More specifically, if the maximum pulse width determined by the restriction of the pulse width is taken as PLSlim and the pulse width determined by comparing the voltage Vfb with the voltage Vis in the light load state is taken as PLSlow, the following relationship can be obtained.

This can substantially equalize the power consumption in the light load state to that of a conventional example.

$$PLSlim > PLSlow \quad (8)$$

As described above, in the present exemplary embodiment, the addition of the pulse width restriction unit 305 and the reference voltage 306 allows the output ripple to be reduced in the middle load state without increasing power consumption in the light load state.

A second exemplary embodiment is described below.

Figure 3:
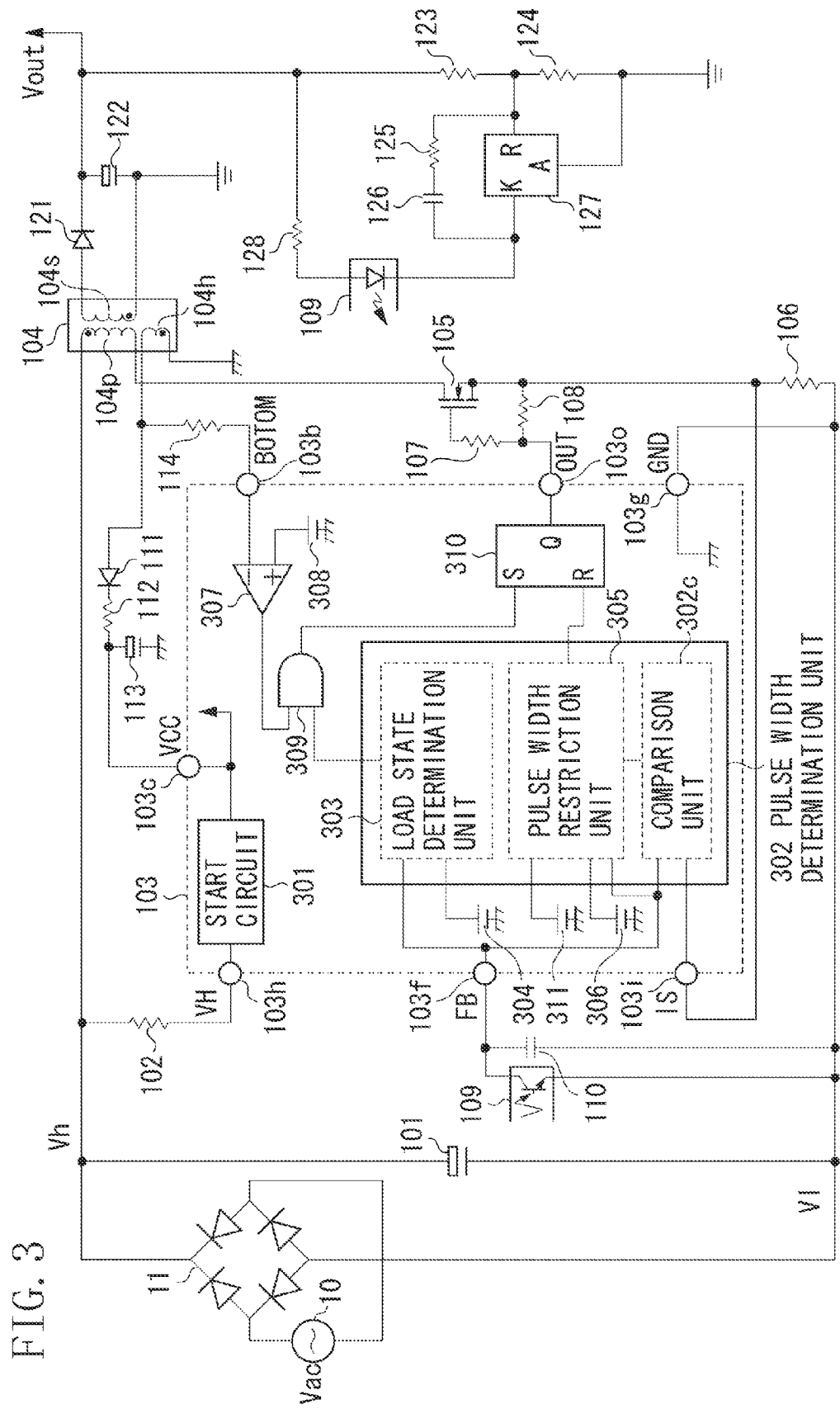
FIG. 3 illustrates a configuration of a switching power supply according to a second exemplary embodiment.
Figure 4:
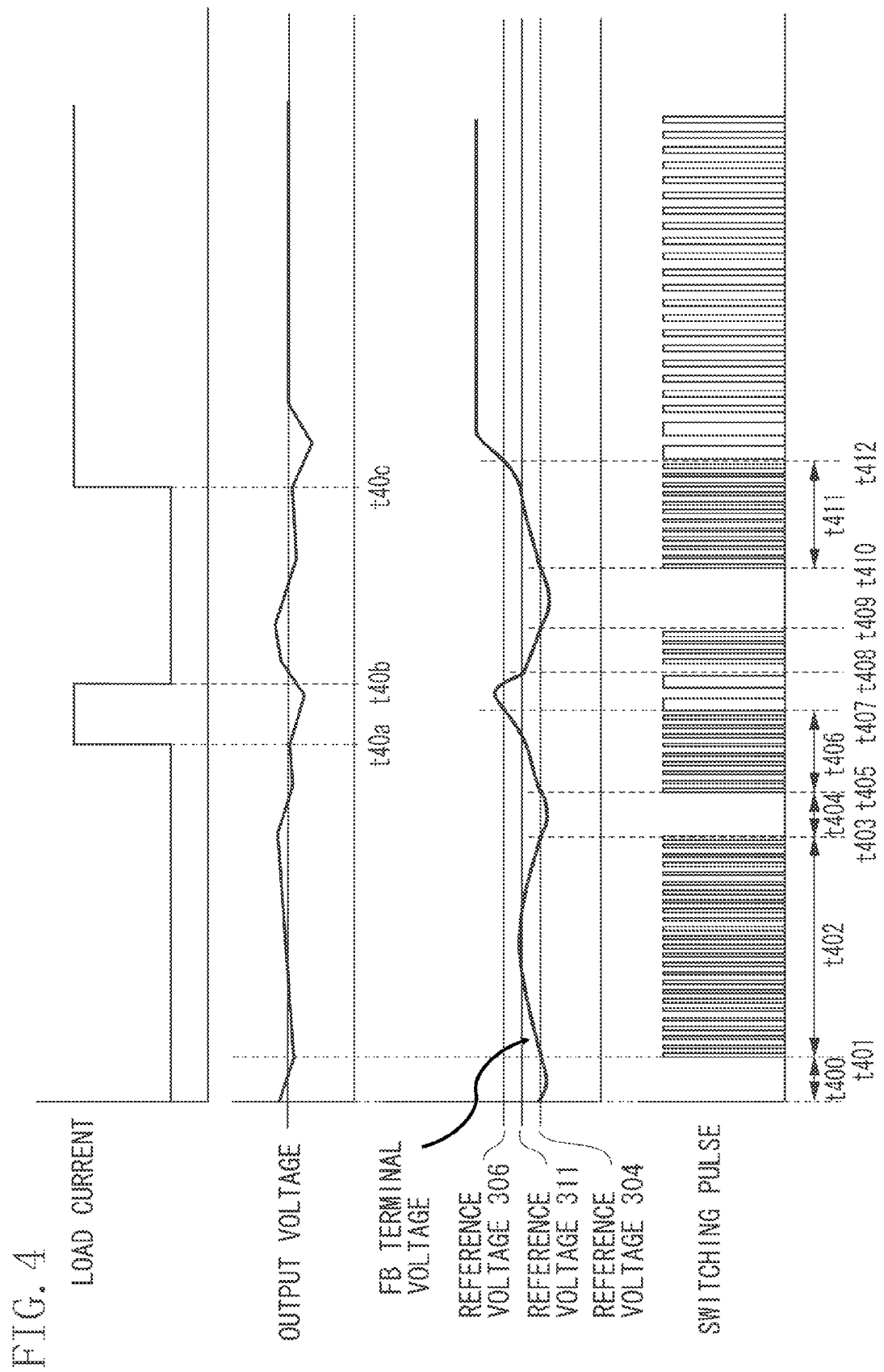
FIG. 4 illustrates operational waveforms of the switching power supply according to the second exemplary embodiment.

FIG. 3 illustrates a switching power supply according to the second exemplary embodiment. The components similar to those of the switching power supply described in FIG. 5 and those according to the first exemplary embodiment are given the same reference numerals and the description thereof is omitted. FIG. 4 illustrates operational waveforms representing characteristics of the switching power supply according to the second exemplary embodiment.

In the first exemplary embodiment, the feedback terminal voltage Vfb is compared with the reference voltage 304 and the reference voltage 306 which are connected to the pulse width determination unit 302 to switch the burst operation, the pulse width restriction, and the release of restriction of the pulse width. In the present exemplary embodiment, if an abrupt change in a load from the heavy load state to the light load state occurs, overshoot or undershoot of output voltage may be temporarily caused by delay of feedback response and output capacitance.

The second exemplary embodiment is characterized by including a configuration for suppressing increase in output variation at the time of such an abrupt change in a load.

More specifically, the second exemplary embodiment is characterized by adding a third reference voltage 311 connected to the pulse width restriction unit 305 to the switching power supply according to the first exemplary embodiment described in FIG. 1.

A characteristic operation thereof in the present exemplary embodiment is described below with reference to FIG. 4.

A relationship between the reference voltages in the present exemplary embodiment can be represented by the following formula:

$$\text{the reference voltage 306} > \text{the reference voltage 311} > \text{the reference voltage 304} \quad (9)$$

In FIG. 4, when load current temporarily increases (timing t40a) in a state where the burst operation similar to that described in the first exemplary embodiment is performed (at a timing t405), the pulse width restriction unit 305 repeats switching operation while restricting the upper limit of the pulse width until the feedback terminal voltage Vfb exceeds the reference voltage 311 and reaches the reference voltage 306. Thereafter, when the voltage Vfb slightly exceeds the reference voltage 306, the pulse width restriction unit 305 releases the restriction of the pulse width and shifts to the switching operation for comparing the voltage Vfb with the voltage Vis (timing t407). After that, when the load current is lowered again (timing t40b), the feedback terminal voltage Vfb becomes smaller than the reference voltage 311. Then, the pulse width restriction unit 305 repeats the switching operation (timing t408 to timing t409) while restricting the pulse width at the time of turning on the FET 105. This suppresses the supply of power to the secondary side.

In the configuration of the first exemplary embodiment, the reference voltage 304 is equal to the reference voltage 311 of the present exemplary embodiment, so that the switching operation for comparing the voltage Vfb with the voltage Vis is performed until the feedback terminal voltage Vfb becomes smaller than the reference voltage 304 and the switching operation is stopped when the feedback terminal voltage Vfb becomes smaller than the reference voltage 304. In this case, the output voltage is lowered by an abrupt change in the load, so that the switching operation with a comparatively large pulse width is performed.

In the present exemplary embodiment, however, the load current is already lowered at a timing t40b in FIG. 4, so that the output voltage repeats larger overshoot and undershoot thereafter.

As described above, in the present exemplary embodiment, when the feedback terminal voltage Vfb becomes smaller than the reference voltage 311, the pulse width restriction unit 305 repeats switching operation (timing t408 to timing t409) while restricting the pulse width at the time of turning on the FET 105 until the feedback terminal voltage Vfb becomes lower than the reference voltage 304. This allows suppressing the overshoot of the output voltage.

In FIG. 4, thereafter, when the load current is increased again at timing t40c and the feedback terminal voltage Vfb exceeds the reference voltage 306, the pulse width restriction unit 305 releases the restriction of the pulse width and shifts to a normal switching operation.

As described above, according to the present exemplary embodiment, the output ripple in the middle load state can be reduced without increasing the power consumption in the light load state and a variation in the output voltage can be suppressed also at the time of an abrupt change in the load.

As viewed from the present exemplary embodiment, the configuration of the first exemplary embodiment can be considered that the reference voltages 311 and 304 are identical values.

In the first and second exemplary embodiments, a continuous oscillation can occur by further decreasing the pulse width restricted by the pulse width restriction unit 305, however, the continuous oscillation increases power consumption. Therefore, if the pulse width is restricted, the pulse width in which the ripple can be reduced while maintaining the output voltage has only to be set on the assumption that burst operation is performed.

Application Example of the Switching Power Supply

The switching power supply described in the first and second exemplary embodiments can be applied as a low-voltage power supply for an image forming apparatus such as a laser beam printer, a copying machine, and a facsimile machine, for example. The following describes an application example of the switching power supply.

The switching power supply is applied as a power supply for supplying power to a controller functioning as a control unit of the image forming apparatus or to a motor functioning as a drive unit of a conveyance roller for conveying a sheet functioning as a recording material.

Figure 10A:
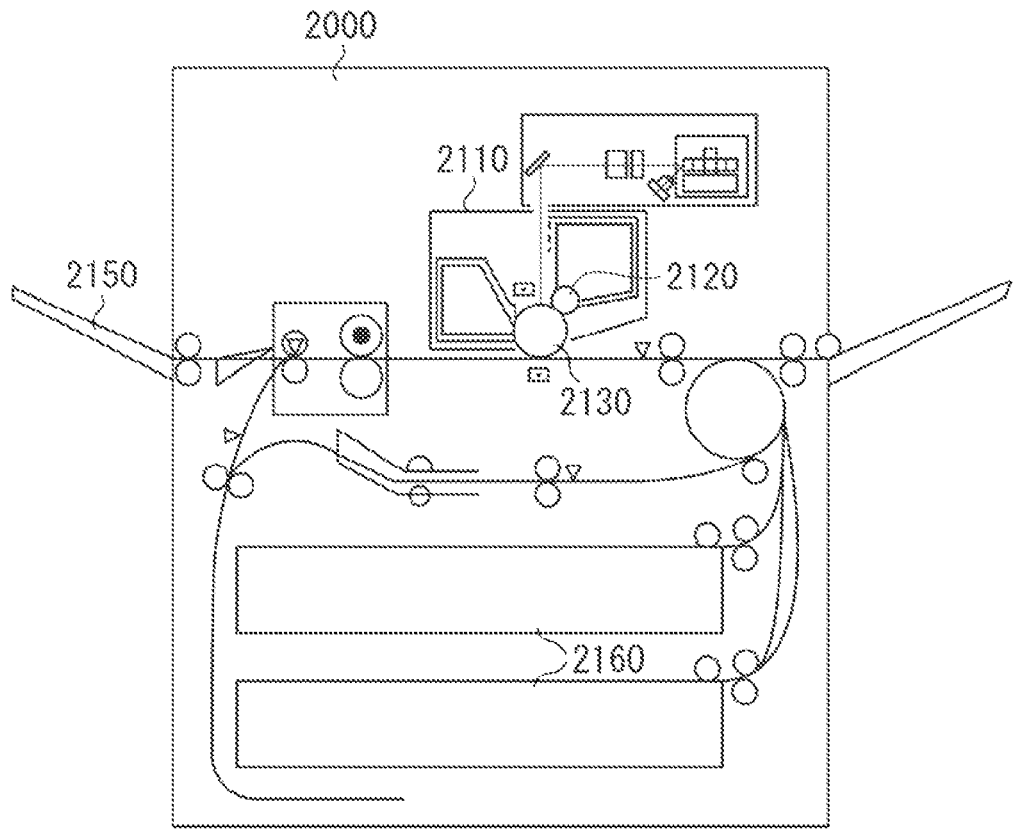
FIGS. 10A and 10B illustrate examples of application of the switching power supply.

FIG. 10A illustrates a schematic diagram of a laser beam printer being an example of the image forming apparatus. A laser beam printer 2000 includes, as an image forming unit 2100, a photosensitive drum 2110 functioning as an image bearing member on which a latent image is formed and a developing unit 2120 for developing the latent image formed on the photosensitive drum 2110 by tonner. The toner image developed on the photosensitive drum 2110 is transferred to a sheet (not illustrated) functioning as a recording medium supplied from a cassette 2160, the toner image transferred to the sheet is fixed, and the sheet is discharged to a tray 2150.

Figure 10B:
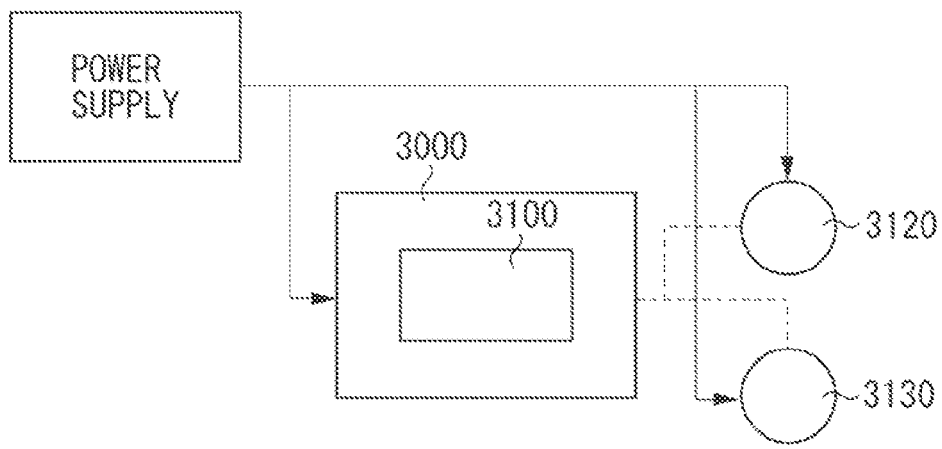

FIG. 10B illustrates a power supply line from the power supply to the controller functioning as the control unit of the image forming apparatus and to the motor functioning as the drive unit. The power supply can be applied as a power supply for supplying power to a controller 3000 including a central processing unit (CPU) 3100 for controlling such an image-forming operation or to motors 3120 and 3130 functioning as drive units for forming an image. Similar to the power supply described in the above exemplary embodiment, as the image forming apparatus, the power consumption of the switching power supply can be reduced when the image forming apparatus shifts to an energy saving state, for example. The output ripple can be reduced in the middle load state such as standby state where the image forming apparatus waits for instructions for forming an image. Even in an abrupt change in a load depending on the operation of the image forming apparatus, the variation of the output voltage can be suppressed.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-225131 filed Oct. 10, 2012, which is hereby incorporated by reference herein in its entirety.

What is claimed is:

1. A power supply device including a transformer having a primary winding and a secondary winding, and a switching element connected to the primary winding configured to drive the transformer to output voltage from the secondary winding, the power supply device comprising:
   a control unit configured to drive the switching element such that the switching element is turned on and, when first signal value of a signal according to current flowing to the primary winding reaches second signal value of a signal according to voltage output from the secondary winding, the switching element is turned off,
   wherein, in a case where the control unit performs an intermittent drive operation which repeats a period for which the switching element is driven and a period for which the drive of the switching element is stopped, when the second signal value of a signal according to the voltage output from the secondary winding is between a first reference value and a second reference value greater than the first reference value the control unit drives the switching element such that the switching element is turned off before first signal value of a signal according to the current flowing to the primary winding reaches second signal value of a signal according to the voltage output from the secondary winding in the period for which the switching element is driven.

2. The power supply device according to claim 1, wherein, in a case where the second signal value of a signal according to the voltage output from the secondary winding exceeds the second reference value, the control unit switches to a continuous drive operation for continuing the period for which the switching element is driven without including the period for which the drive of the switching element is stopped.

3. The power supply device according to claim 1, wherein the transformer further includes an auxiliary winding, and
   wherein the control unit controls the switching element to be turned on based on voltage generated at the auxiliary winding.

4. The power supply device according to claim 1,
   wherein, in a case where the second signal value of a signal according to the output voltage exceeds the first reference value, the control unit continuously activates the switching element.

5. An image forming apparatus for forming an image on a recording material, the image forming apparatus comprising:
   a power supply configured to supply power to the image forming apparatus,
   wherein the power supply includes a transformer having a primary winding and a secondary winding, and a switching element connected to the primary winding configured to drive the transformer to output voltage from the secondary winding, wherein the power supply includes a control unit configured to drive the switching element such that the switching element is turned on and, when first signal value of a signal according to current flowing to the primary winding reaches second signal value of a signal according to voltage output from the secondary winding, the switching element is turned off,
   wherein, in a case where the control unit performs an intermittent drive operation which repeats a period for which the switching element is driven and a period for which the drive of the switching element is stopped, when the second signal value of a signal according to the voltage output from the secondary winding is between a first reference value and a second reference value greater than the first reference value the control unit drives the switching element such that the switching element is turned off before first signal value of a signal according to the current flowing to the primary winding reaches second signal value of a signal according to the voltage output from the secondary winding in the period for which the switching element is driven.

6. The image forming apparatus according to claim 5, wherein, in a case where the second signal value of a signal according to the voltage output from the secondary winding exceeds the second reference value, the control unit switches to a continuous drive operation for continuing the period for which the switching element is driven without including the period for which the drive of the switching element is stopped.

7. The image forming apparatus according to claim 5, wherein the transformer further includes an auxiliary winding, and
   wherein the control unit controls the switching element to be turned on based on voltage generated at the auxiliary winding.

8. The image forming apparatus according to claim 5,
   wherein, in a case where the second signal value of a signal according to the output voltage exceeds the first reference value, the control unit continuously activates the switching element.

\* \* \* \* \*